United States Patent
Cantrell et al.

(10) Patent No.: US 7,601,858 B2
(45) Date of Patent: Oct. 13, 2009

(54) METHOD OF PROCESSING ETHANOL BYPRODUCTS AND RELATED SUBSYSTEMS

(75) Inventors: David Fred Cantrell, Lakemont, GA (US); David J. Winsness, Alpharetta, GA (US)

(73) Assignee: GS Cleantech Corporation, New York, NY (US)

( * ) Notice: Subject to any disclaimer, the term of this patent is extended or adjusted under 35 U.S.C. 154(b) by 578 days.

(21) Appl. No.: 11/122,859

(22) Filed: May 5, 2005

(65) Prior Publication Data

US 2006/0041152 A1    Feb. 23, 2006

Related U.S. Application Data

(60) Provisional application No. 60/602,050, filed on Aug. 17, 2004.

(51) Int. Cl.
  *C11B 1/00*    (2006.01)
(52) U.S. Cl. .......................................................... 554/8
(58) Field of Classification Search ...................... 554/8
  See application file for complete search history.

(56) References Cited

U.S. PATENT DOCUMENTS

| | | |
|---|---|---|
| 2,206,024 A | 7/1940 | Brown |
| 2,216,904 A | 10/1940 | Brown |
| 2,216,905 A | 10/1940 | Brown et al. |
| 2,263,608 A | 11/1941 | Brown |
| 2,446,913 A | 8/1948 | Erlich |
| 2,524,718 A | 10/1950 | Stark |
| 2,615,029 A | 10/1952 | Rosten |
| 2,663,718 A | 12/1953 | Strezynski |
| 3,721,568 A | 3/1973 | Wilson |
| 3,950,230 A | 4/1976 | Greenfield et al. |
| 4,341,713 A | 7/1982 | Stolp et al. |
| 4,407,955 A | 10/1983 | Muller et al. |
| 4,944,954 A | 7/1990 | Strop et al. |
| 5,250,182 A | 10/1993 | Bento et al. |
| 5,269,947 A | 12/1993 | Baskis |
| 5,316,782 A | 5/1994 | Zimlich, III |
| 5,662,810 A | 9/1997 | Willgohs |
| 5,801,140 A | 9/1998 | Langley et al. |
| 5,958,233 A | 9/1999 | Willgohs |
| 5,998,641 A | 12/1999 | Ganguli et al. |
| 6,146,645 A | 11/2000 | Deckers et al. |
| 6,433,146 B1 | 8/2002 | Cheryan |

(Continued)

OTHER PUBLICATIONS

Singh, et al., "Extraction of Oil from Corn Distillers Dried Grains with Solubles", 1998, Transactions of the ASAE, Bol. 41(6), pp. 1175 and 1176.*

(Continued)

*Primary Examiner*—Deborah D Carr
(74) *Attorney, Agent, or Firm*—Cantor Colburn LLP

(57) ABSTRACT

In one aspect of the invention, a method recovers oil from a concentrated byproduct, such as evaporated thin stillage formed during a dry milling process used for producing ethanol. The method includes forming a concentrate from the byproduct and recovering oil from the concentrate. The step of forming the concentrate may comprise evaporating the byproduct. Further, the step of separating the oil from the concentrate may comprise using a centrifuge and, in particular, a disk stack centrifuge. Other aspects of the invention include related methods and subsystems for recovering oil from thin stillage.

16 Claims, 4 Drawing Sheets

U.S. PATENT DOCUMENTS

| | | |
|---|---|---|
| 6,761,914 B2 | 7/2004 | Deckers et al. |
| 2003/0093832 A1 | 5/2003 | Szarka et al. |
| 2003/0180415 A1 | 9/2003 | Stiefel et al. |
| 2004/0081654 A1 | 4/2004 | Schryvers et al. |
| 2004/0082044 A1 | 4/2004 | Prevost et al. |
| 2004/0087808 A1* | 5/2004 | Prevost et al. .......... 554/9 |

OTHER PUBLICATIONS

Yokoyama, et al. "Liquid Fuel Production from Ethanol Fermentation Stillage" 1986, The Chemical Society of Japan, pp. 649-652.*

Minowa, T. et al., Oil Production form Buchwheat Stillage by Thermochemical Liquefactional, 1993, national Inst. for Resources and Environment, Ibaraki (Japan), STN, Abstract, NTIS database.*

Yokoyama, et al., "Liquid Fuel Production from Ethanol Fermentation Stillage," 1986, The Chemical Society of Japan, pp. 649-652.

"Disk Stack Centrifuge Technology," Alfa Laval website, www.alfalaval.com, Aug. 3, 2004.

N. Singh and M. Cheryan, Extraction of Oil from Corn Distillers Dried Grains with Solubles, Transactions of the ASAE, 1998, pp. 1775-1777, vol. 41(6).

Y. Dote et al., Liquefaction of Stillage from Ethanolic Fermentation and Upgrading of Liquefied Oil, Trans. Mat. Res. Soc. Jpn., 1994, pp. 285-288, vol. 18A.

(No Author Available), "Thermochemical Liquefaction", article by Wisconsin Biorefining Development Initiative, www.wisbiorefine.org, p. 1-4, undated.

International Search Report dated Mar. 11, 2008.

International Search Report dated Aug. 20, 2008.

Alfa Laval, "NS 934 DD Decanter," PFT00017EN 0207, PFT00018EN 0207, PFT00007EN 0207, 6 pags., 1999.

(No Author Available) "Thermochemical Liquefaction" article by Wisconsin Biorefining Development Initiative, www.wisbiorefine.org. pp. 1-4, undated, 2004.

(No Author Available), "Thermochemical Liquefaction", article by Wisconsin Biorefining Development Initiative, www.wisbiorefine.org, pp. 1-4, undated, 2004.

Mcintyre, Craig., "Measurement solutions for Ethanol Producers", A white paper by Endress+Hauser, Inc., Copyright 2003, pp. 1-10.

Jacques et al. "The Alcohol Textbook" 3rd Edition, published 1999, Part 1 of 4 Parts, 53 pgs.

Jacques, et al., "The Alcohol Textbook", 3rd Edition, published 1999, Part 2 of 4 Parts, 50 pgs.

Jacques, et al., "The Alcohol Textbook", 3rd Edition, published 1999, Part 3 of 4 Parts, 50 pgs.

Jacques, et al., "The Alcohol Textbook", 3rd Edition, published 1999, Part 4 of 4 Parts, 42 pgs.

* cited by examiner

METHOD OF PROCESSING ETHANOL BYPRODUCTS AND RELATED SUBSYSTEMS

This application claims the benefit of U.S. Provisional Patent Application Ser. No. 60/602,050, filed Aug. 17, 2004, the disclosure of which is incorporated herein by reference.

COPYRIGHT STATEMENT

A portion of the disclosure of this document contains material subject to copyright protection. No objection is made to the facsimile reproduction of the patent document or this disclosure as it appears in the Patent and Trademark Office files or records, but any and all rights in the copyright(s) are otherwise reserved.

TECHNICAL FIELD

The present invention relates generally to recovering oil and, more particularly, to recovering oil from a byproduct of the dry milling process used to form ethanol.

BACKGROUND OF THE INVENTION

Over the past thirty years, significant attention has been given to the production of ethyl alcohol, or "ethanol," for use as an alternative fuel. Ethanol not only burns cleaner than fossil fuels, but also can be produced using grains such as corn, which are of course renewable resources. At present, approximately sixty-nine "dry milling" plants in the United States produce over two billion gallons of ethanol per year. Additional plants presently under construction are expected to add over four hundred million gallons to this total in an effort to meet the current high demand.

As noted in the foregoing discussion, a popular method of producing ethanol is known as "dry milling," and in the United States is typically practiced using corn. As is well known in the industry, the dry milling process utilizes the starch in the corn or other grain to produce the ethanol through fermentation, and creates a waste stream comprised of byproducts termed "whole stillage" (which may be further separated into products known as distillers wet grains and "thin stillage"). Despite containing valuable oil, this whole stillage has for the most part been treated as waste and used primarily to supplement animal feed (mostly in the form of distillers dried grains with solubles (DDGS), which is created by evaporating the thin stillage, recombining the resulting concentrate or syrup with the distillers wet grains, and drying the product to have a low moisture content; see, e.g., U.S. Pat. Nos. 5,662,810 and 5,958,233, the disclosures of which are incorporated herein by reference).

Efforts to recover the valuable oil from this byproduct have not been successful in terms of efficiency or economy. For example, one approach involves attempting to separate the oil from the thin stillage before the evaporation stage, such as using a centrifuge. However, spinning the thin stillage at this stage does not produce usable oil, but rather merely creates an undesirable emulsion phase requiring further processing. Moreover, the volume of thin stillage present is generally 2 to 10 times greater than the syrup, which requires considerable capital to purchase the number of centrifuges required. Together, these obstacles make attempts to recover oil from thin stillage highly inefficient and uneconomical.

U.S. Pat. No. 5,250,182 (the disclosure of which is incorporated herein by reference) describes the use of filters for removing substantially all solids and recovering lactic acid and glycerol from the thin stillage without the need for evaporation. Despite eliminating a step in the conventional process, the proposal results in a more complicated arrangement requiring multiple filtration steps. Wholesale elimination of the evaporator in the vast majority of existing plants is also unlikely and otherwise uneconomical. Filters, and especially the microfiltration and ultrafiltration types proposed in this patent, are also susceptible to frequent plugging and thus disadvantageously increase the operating cost. For these reasons, the filtration process proposed in this patent has not gained widespread commercial acceptance.

Accordingly, a need exists for a more efficient and economical manner of recovering oil from a byproduct containing it, such as thin stillage created during the dry milling process used to produce ethanol.

SUMMARY OF THE INVENTION

In accordance with one aspect of the invention, a method of processing a concentrated byproduct of a dry milling process for producing ethanol, such as by using corn, is disclosed. In its most basic form, the method comprises recovering oil from the concentrated byproduct.

In one embodiment, the byproduct comprises thin stillage, and the method includes the step of evaporating the thin stillage to form a concentrate. The recovering step may further comprise separating the oil from the concentrate using a disk stack centrifuge. Preferably, the recovering step comprises: (1) providing the concentrated byproduct at a temperature of between about 150 and 212° F. and, most preferably, at a temperature of about 180° F.; and/or (2) providing the concentrated byproduct having a pH of between about 3 and 6 and, most preferably, between about 3.5 and 4.5. Additionally, it is preferred that the concentrated byproduct have a moisture content greater than 15% by weight, more preferably a moisture content greater than 50% and less than 90% and, most preferably, a moisture content between about 60-85%. The step of recovering the oil from the concentrated byproduct produces syrup, and the method may further include the step of recovering oil from the syrup.

In accordance with another aspect of the invention, a more specific method of processing concentrated thin stillage created by a dry milling process for producing ethanol, such as from corn, is disclosed. The method comprises recovering oil from the concentrated thin stillage having a moisture content of less than about 90% by weight.

In one embodiment, the recovering step comprises separating the oil from the concentrate using a disk stack centrifuge. The method may further include the step of drying the concentrate after the removing step.

In accordance with still another aspect of the invention, a method of recovering oil from thin stillage is disclosed. The method comprises evaporating the thin stillage to create a concentrate having a moisture content of greater than 15% by weight and less than about 90% by weight. Oil is then recovered by centrifuging the concentrate, preferably using a disk stack centrifuge.

In accordance with yet another aspect of the invention, a method of processing whole stillage is disclosed. The method comprises recovering thin stillage including oil and solids from the whole stillage, concentrating the thin stillage including the solids, and recovering oil from the concentrate.

In one embodiment, the step of recovering the thin stillage includes using a separator selected from the group consisting of a press, extruder, a decanter centrifuge, and a screen centrifuge. The concentrating step may comprise processing the thin stillage to a temperature of between about 150 and 212° F., a pH of between about 3 and 6, and a moisture content of less than 90%. The step of recovering oil comprises separating the oil from the concentrate using a centrifuge. The recovering and concentrating steps may be performed in a continuous fashion. The method may further include drying the concentrate after recovering oil.

In accordance with a further aspect of the invention, a subsystem for use in a system for producing ethanol by dry milling and creating thin stillage as a byproduct is disclosed. The subsystem comprises an evaporator for evaporating the thin stillage to form a concentrate, and a centrifuge for receiving the concentrate and recovering oil therefrom. Preferably, the concentrate has a moisture content of less than about 90% by weight, and the centrifuge is a disk stack type.

Still a further aspect of the invention is a subsystem for use in a system for producing ethanol by dry milling and creating thin stillage as a byproduct. The subsystem comprises an evaporator for evaporating the thin stillage to form a concentrate and means for recovering oil from the concentrate. In one embodiment, the recovering means comprises a centrifuge and, most preferably, a disk stack centrifuge.

Yet a further aspect of the invention is the combination of a concentrate formed from thin stillage including oil and a centrifuge for removing at least a portion of the oil from the concentrate. Preferably, the concentrate has a moisture content of greater than 15% by weight and less than about 90% by weight, and the centrifuge is a self-cleaning bowl type of disk stack centrifuge, a nozzle bowl disk stack centrifuge, or a horizontal centrifugal decanter

DETAILED DESCRIPTION OF THE INVENTION

In accordance with one aspect of the invention, a method recovers oil from a byproduct resulting from the production of ethanol using a dry milling technique (which is extensively described in the above-referenced '182 patent). The byproduct, known as "thin stillage," is recovered by separating the distillers wet grain from the "whole stillage" leftover after fermentation is complete. As is known in the art, this mechanical separation may be accomplished using a press/extruder, a decanter centrifuge, or a screen centrifuge. Moisture is then removed from the unfiltered thin stillage to create a concentrate or syrup, such as through evaporation. Advantageously, usable oil is then easily recovered from this concentrated form of the byproduct through relatively simple mechanical processing, without the prior need for multiple stages of filtration or other expensive and complicated undertakings.

In one embodiment, oil is recovered from the concentrate by passing it through a centrifuge and, in particular, a disk stack centrifuge (and most preferably a self-cleaning bowl type). Preferably, the concentrate fed to the disk stack centrifuge is at a temperature of between about 150 and 212° F. (and ideally 180° F.) and a pH of between about 3 and 6 (ideally between about 3.5 and 4.5). As a result of the preceding evaporation step, the concentrate has a moisture content of greater than 15% and less than about 90%, more preferably between 30% and about 90%, and ideally about 60-85% by weight. Under these process conditions, the disk stack centrifuge is able to separate the oil in usable form from the concentrate in an efficient and effective manner, despite the relatively high level of solids present (which may be recovered from the centrifuge in a continuous or intermittent fashion, depending on the particular process conditions).

Besides creating usable oil, the concentrate or syrup recovered from the disk stack centrifuge is considered more valuable. This is because the post-evaporation processing to recover or remove the oil improves the efficiency of the drying process used on the combined concentrate syrup and distillers wet grains. A stable, flowable product for supplementing animal feed results, which thus further complements the value of the oil recovered.

Two examples are presented below to demonstrate the efficacy of the above-described method.

EXAMPLE 1

Figure 1:
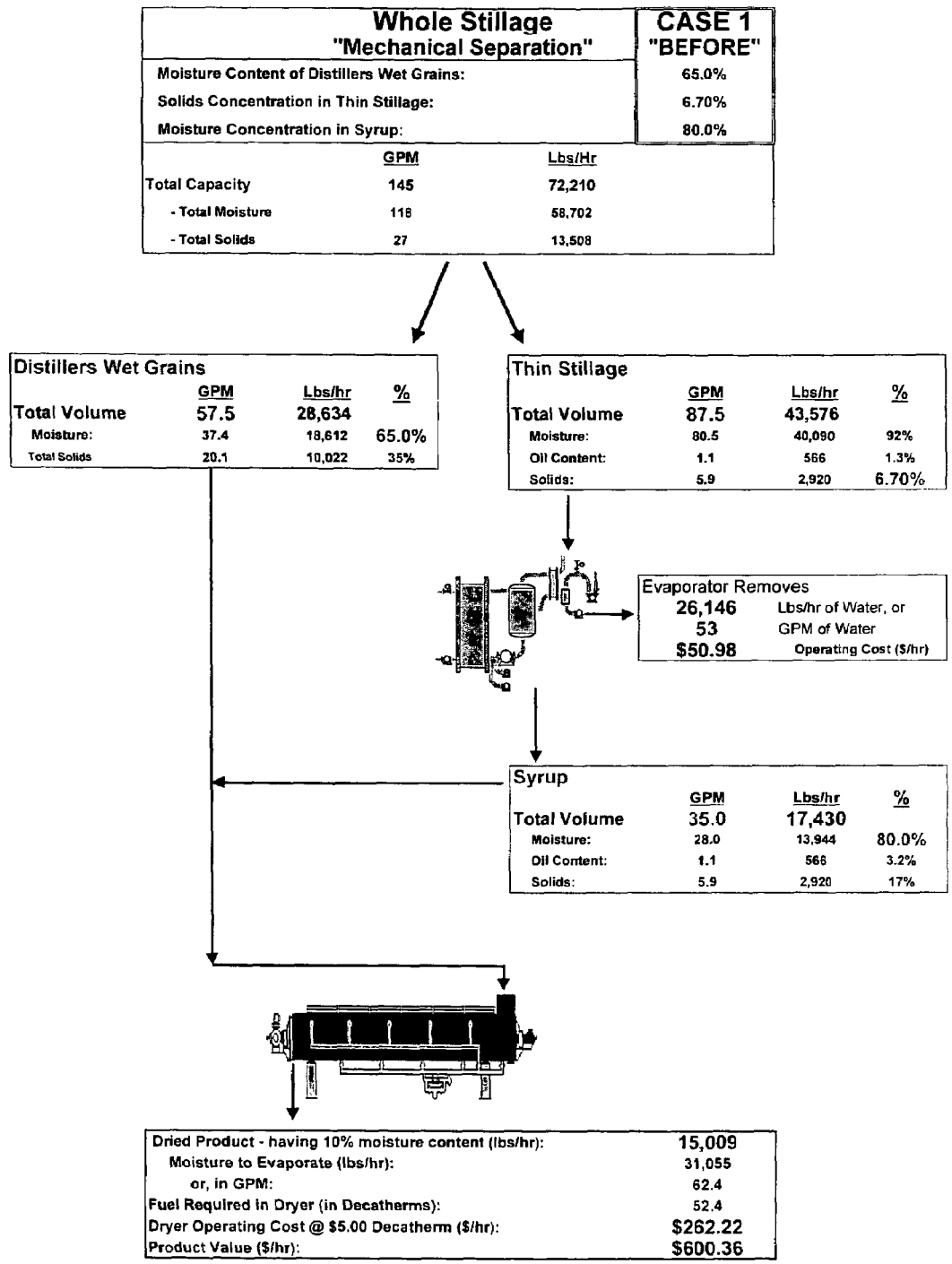
FIG. 1 is a partially schematic flow chart illustrating the processing of co-products formed during the ethanol extraction process.
Figure 2:
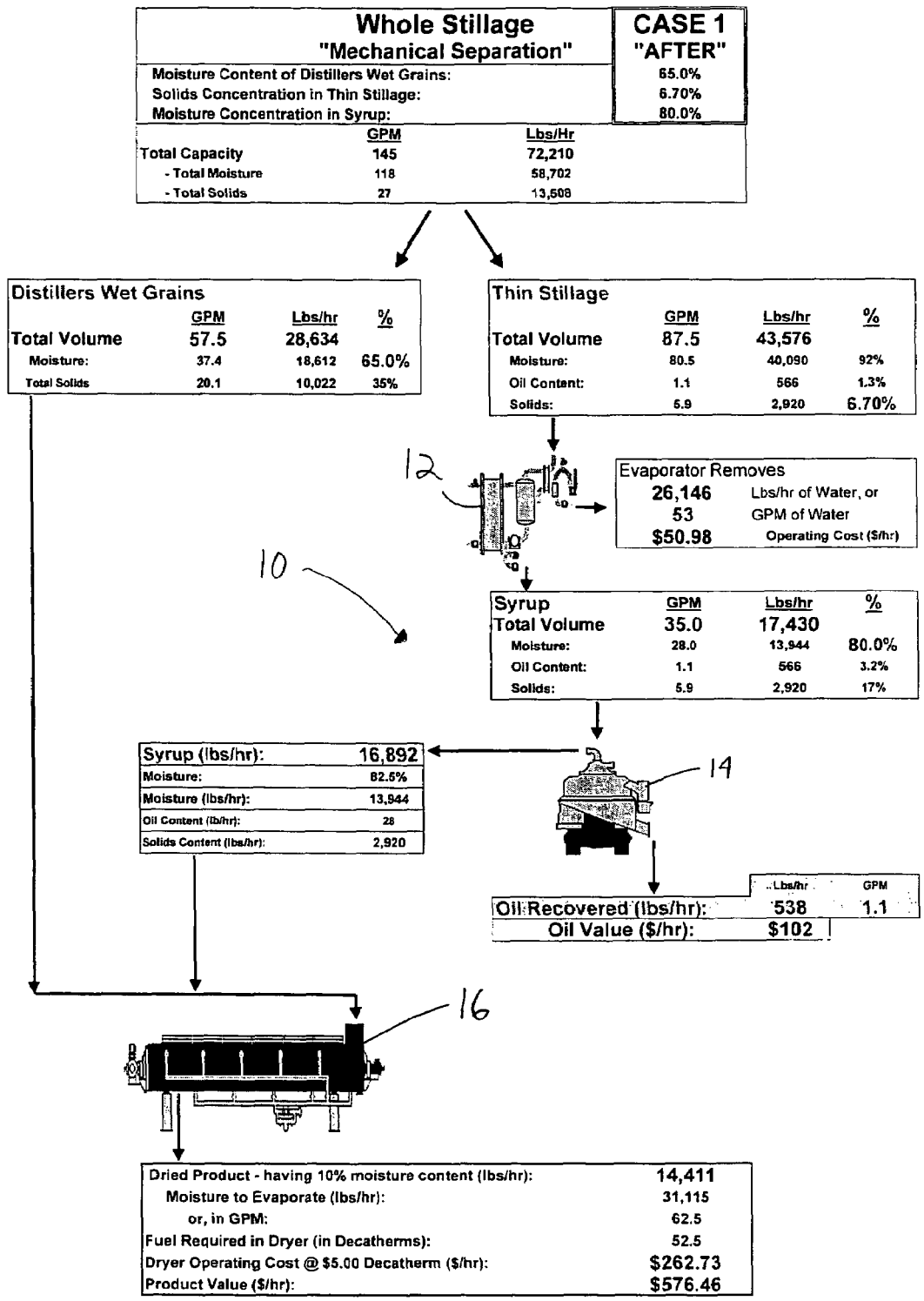
FIG. 2 is a partially schematic flow chart illustrating the recovery of oil from a syrup formed by evaporating the thin stillage.

Reference is made to FIGS. 1 and 2 to illustrate schematically a first example demonstrating the efficacy of the present method.

FIG. 1 represents one technique for processing whole stillage resulting from dry milling corn to create distillers dried grains with solubles. The whole stillage leftover after deriving the ethanol is mechanically separated into distillers wet grains (approx. 35% solids) and thin stillage (approx. 6.7% solids), such as by using a centrifugal decanter. The thin stillage is then introduced to an evaporator to create a syrup having a moisture content of approximately 80% by weight and about 17% solids by weight. The syrup is then recombined with the distillers wet grains, introduced to a drum dryer, and dried to reduce the overall moisture content to approximately 10% by weight. An estimated total value of the resulting distillers dried grains with solubles is $600.36 per hour.

FIG. 2 represents the inventive method and a related subsystem 10 for implementing it. Initial processing of the whole stillage is done in the same fashion, and the mechanically separated thin stillage is delivered to the evaporator 12 forming part of the subsystem 10. The resulting concentrate or syrup having a moisture content of approximately 80% by weight and a solids content of approximately 17% by weight is delivered to a disk stack centrifuge 14, and preferably a "solids ejecting" one, such as an Alfa Laval Model No. AFPX 510, AFPX 513, or AFPX 617 or equivalent device. At an infeed rate of approximately 35 gallons per minute, this centrifuge 14 recovers usable oil at a rate of 538 pounds per hour and produces syrup having a having a moisture content of 82.5% by weight, but with far less oil in view of the preceding recovery step.

Recombining the syrup (which is substantially free of oil) from the centrifuge 14 with the distillers wet grains and drying in a drum dryer 16 to a moisture content of 10% by weight results in a product having a value of $576.46 per hour. However, the 538 pounds per hour of oil recovered has a product value of approximately $102 per hour. Accordingly, the total product value using the inventive method is $678.46 per hour, which is approximately 12% greater than the $600.36 per hour product value resulting from use of the conventional set-up shown in FIG. 1. Moreover, removal of the majority of the oil before the drying step makes the process more efficient, and results in an estimated energy savings of approximately 10%, or $26.27 per hour. As a result, product value per hour ($678.46) less the estimated dryer operating cost ($236.46 per hour with the 10% savings) and less the estimated evaporator operating cost ($50.98 per hour) is about $391.02 per hour.

EXAMPLE 2

Figure 3:
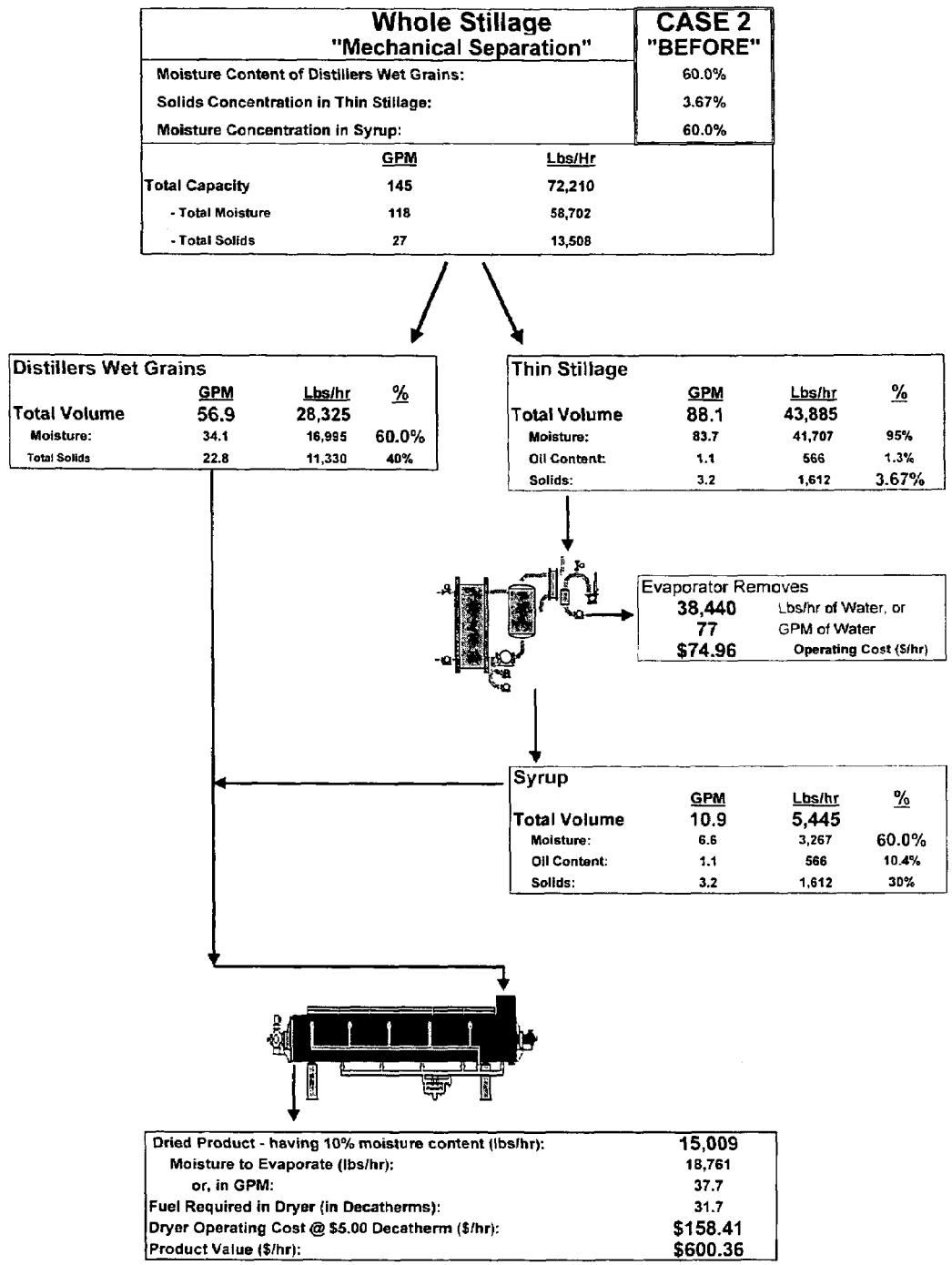
FIG. 3 is a schematic view similar to FIG. 1.
Figure 4:
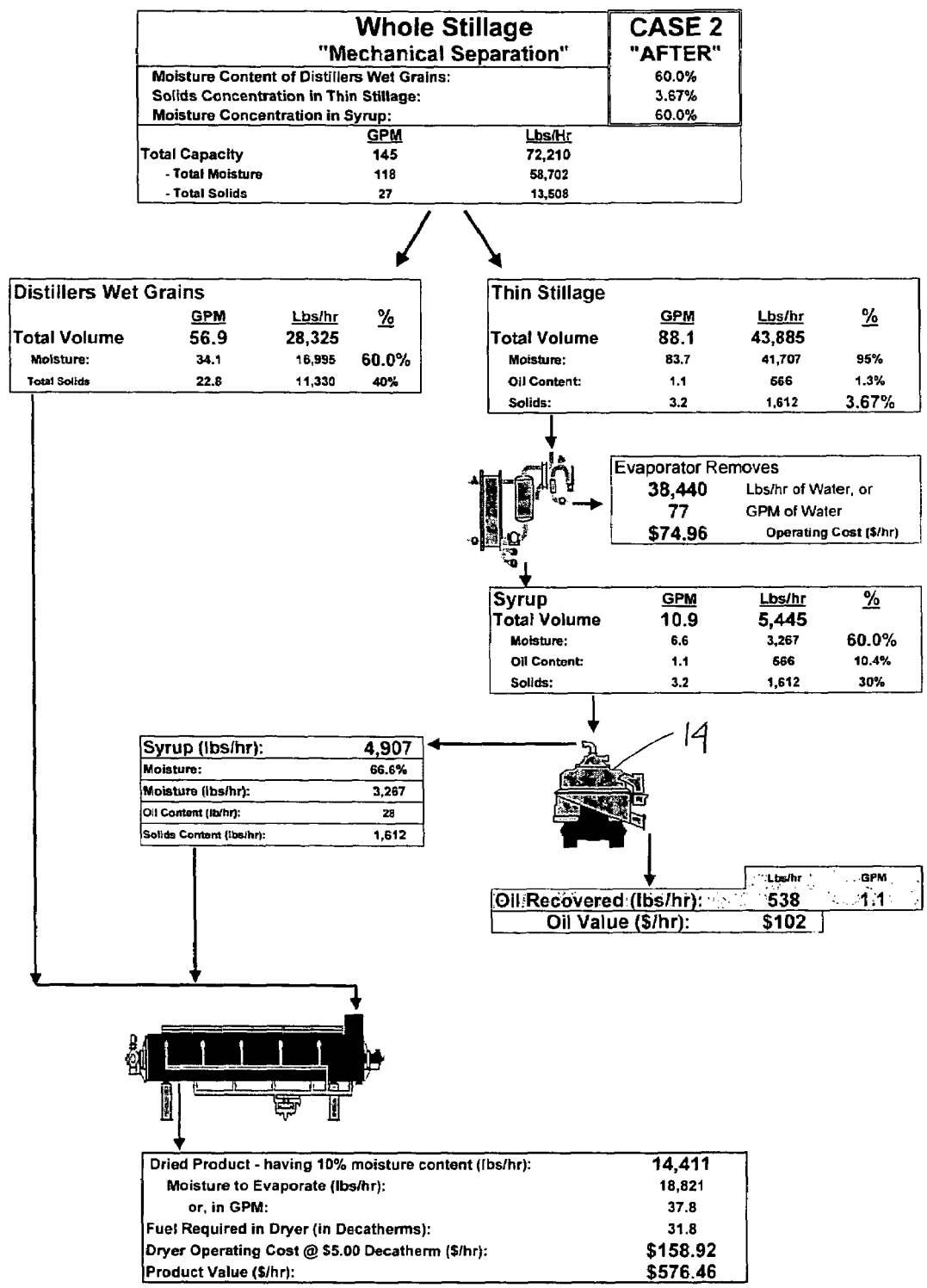
FIG. 4 is a schematic view similar to FIG. 2.

Reference is made to FIGS. 3 and 4, which illustrate a prophetic comparison between one processing method and the inventive method. The set-up is essentially the same as shown in FIGS. 1 and 2, but a more effective centrifugal decanter is used than the one used in Example 1. As a result, the syrup introduced to the disk stack centrifuge 14 would have a moisture content estimated at 60% by weight. While this does not impact the product value figures, the syrup from the centrifuge 14 has a moisture content of only 66.6% by weight, as compared to 82.5% by weight in Example 1. As a result, the cost per hour of drying this syrup when combined with the distillers wet grains to achieve an end product having a moisture content of less than 10% is only $158.92, or approximately 40% less. Assuming a savings in dryer efficiency of 10%, the product value per hour ($678.46) less the estimated dryer operating cost ($143.03 per hour) and less the estimated evaporator operating cost ($74.96 per hour) is $460.46 per hour. This represents an approximate 15% increase over the corresponding value calculated for Example 1.

As should be appreciated, the above-described method and subsystem of the preferred embodiment essentially require the addition of a centrifuge downstream of the evaporator in the conventional system for processing thin stillage (which centrifuge may thus be considered a "means for" recovering oil from thin stillage). Accordingly, instructions on how to implement the above-described method (including the optimum process variables) may be provided along with a centrifuge for use in an ethanol plant for forming the novel subsystem 10 disclosed herein. Such instructions result in the most efficient implementation of the method, as compared to the situation where the scientists or engineers at the plant must experiment with the centrifuge to determine the optimum process conditions required to achieve a favorable result.

The foregoing description provides illustration of the inventive concepts. The descriptions are not intended to be exhaustive or to limit the disclosed invention to the precise form disclosed. Modifications or variations are also possible in light of the above teachings. For example, the syrup recovered from the centrifuge may be evaporated and processed again in a further effort to recover oil before drying. Moreover, in addition to a self-cleaning bowl type of disk stack centrifuge, a nozzle bowl disk stack centrifuge would work as a means for recovering oil from the concentrate, as would a horizontal centrifugal decanter (which may be especially beneficial when the moisture content of the concentrate is less than 50% by weight) or other like devices for separating oil from a substance including suspended solids. Moreover, besides corn, the present invention may have utility with any other grain used in a dry milling process for producing ethanol, such as for example, milo. The embodiments described above were chosen to provide the best application to thereby enable one of ordinary skill in the art to utilize the inventions in various embodiments and with various modifications as are suited to the particular use contemplated. All such modifications and variations are within the scope of the invention.

The invention claimed is:

1. A method of recovering oil from thin stillage, the method comprising, in sequence:

evaporating the thin stillage to remove water and form a concentrated byproduct; and recovering oil from the concentrated byproduct by heating and mechanically processing the concentrated byproduct to separate the oil from the concentrated byproduct, wherein the concentrated byproduct has a moisture content of greater than 30% and less than 90% by weight.

2. The method of claim 1, wherein the mechanical processing comprises separating the oil from the concentrated byproduct using a disk stack centrifuge.

3. The method of claim 1, wherein the recovering step is performed on the concentrated byproduct at a temperature of between about 150 and 212° F.

4. The method of claim 1, wherein the recovering step is performed on the concentrated byproduct at a temperature of about 180° F.

5. The method of claim 1, wherein the recovering step is performed on the concentrated byproduct having a pH of between about 3 and 6.

6. The method of claim 1, wherein the recovering step is performed on the concentrated byproduct having a pH of between about 3.5 and 4.5.

7. The method of claim 1, wherein the concentrated byproduct has a moisture content between about 60-85%.

8. A method of recovering oil from thin stillage, comprising, in sequence: evaporating the thin stillage to create a concentrate having a moisture content of greater than 30% by weight and less than about 90% by weight; and centrifuging the concentrate to recover oil.

9. The method according to claim 8, wherein the step of centrifuging the concentrate comprises using a disk stack centrifuge.

10. A method of processing whole stillage, comprising: recovering thin stillage from the whole stillage, the thin stillage including oil and solids; concentrating the thin stillage including the solids to produce a thin stillage concentrate, wherein the thin stillage concentrate has a moisture content of greater than 30% and less than 90% by weight; and recovering oil from the concentrate by a process consisting essentially of heating and mechanically processing the concentrate to separate the oil from the concentrate.

11. The method of claim 10, wherein the step of recovering the thin stillage includes using a separator selected from the group consisting of a press, extruder, a decanter centrifuge, and a screen centrifuge.

12. The method of claim 10, wherein the concentrating step comprises processing the thin stillage to a temperature of between about 150 and 212° F., a pH of between about 3 and 6.

13. The method of claim 10, wherein the step of recovering oil comprises separating the oil from the concentrate using a centrifuge.

14. The method of claim 10, wherein the recovering and concentrating steps are performed in a continuous fashion.

15. The method of claim 10, further including the step of drying the concentrate after the step of recovering the oil.

16. In a method for processing corn to produce ethanol and concentrated thin stillage, the improvement comprising the step of recovering a product consisting essentially of oil from the concentrated thin stillage by heating and mechanically processing the concentrated thin stillage to separate the oil from the concentrated thin stillage.

* * * * *

UNITED STATES PATENT AND TRADEMARK OFFICE
CERTIFICATE OF CORRECTION

PATENT NO.      : 7,601,858 B2                                                    Page 1 of 1
APPLICATION NO. : 11/122859
DATED           : October 13, 2009
INVENTOR(S)     : Cantrell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 973 days.

Signed and Sealed this

Fifth Day of October, 2010

David J. Kappos
*Director of the United States Patent and Trademark Office*